US012085097B2

(12) United States Patent
Gappmaier et al.

(10) Patent No.: US 12,085,097 B2
(45) Date of Patent: Sep. 10, 2024

(54) SWITCH VALVE BLOCK FOR A HYDRAULICALLY ACTUATABLE WORKING MACHINE

(71) Applicants: LIEBHERR-WERK BISCHOFSHOFEN GMBH, Bischofshofen (AT); DANFOSS SCOTLAND LTD., Edinburgh (GB)

(72) Inventors: Rupert Gappmaier, Altenmarkt (AT); Florian Altenberger, Taxenbach (AT); Hans Knapp, Bischofshofen (AT); Josef Stock, Bischofshofen (AT); Alexis Dole, Midlothian (GB); Callan Mackay, Midlothian (GB)

(73) Assignees: LIEBHERR-WERK BISCHOFSHOFEN GMBH, Bischofshofen (AT); DANFOSS SCOTLAND LTD., Edinburgh (GB)

( * ) Notice: Subject to any disclaimer, the term of this patent is extended or adjusted under 35 U.S.C. 154(b) by 0 days.

(21) Appl. No.: 17/781,922

(22) PCT Filed: Dec. 3, 2020

(86) PCT No.: PCT/EP2020/084501
§ 371 (c)(1),
(2) Date: Jun. 2, 2022

(87) PCT Pub. No.: WO2021/110853
PCT Pub. Date: Jun. 10, 2021

(65) Prior Publication Data

US 2023/0340968 A1 Oct. 26, 2023

(30) Foreign Application Priority Data

Dec. 3, 2019 (DE) .................... 10 2019 132 845.4

(51) Int. Cl.
*F15B 11/17* (2006.01)
*E02F 3/42* (2006.01)
(Continued)

(52) U.S. Cl.
CPC .............. *F15B 11/17* (2013.01); *E02F 3/422* (2013.01); *E02F 9/2225* (2013.01); *E02F 9/225* (2013.01);
(Continued)

(58) Field of Classification Search
CPC ...................... F15B 11/17; F15B 13/06; F15B 2211/20576; F15B 2211/41518;
(Continued)

(56) References Cited

U.S. PATENT DOCUMENTS 4,044,786 A * 8/1977 Yip ...................... F15B 11/162
137/101
4,369,625 A * 1/1983 Izumi .................... E02F 9/2242
414/699
(Continued)

FOREIGN PATENT DOCUMENTS

CN 201962040 U 9/2011
DE 10012389 A1 9/2001
(Continued)

*Primary Examiner* — Thomas E Lazo
(74) *Attorney, Agent, or Firm* — Dilworth & Barrese, LLP

(57) ABSTRACT

The present invention relates to a switching valve block for a hydraulically actuable work machine that comprises a plurality of valve block inputs for a respective connection to a pressure output of one or more hydraulic fluid pumps, a plurality of valve block outputs for outputting a pressurized hydraulic fluid, and at least one valve that is arranged between valve block inputs and valve block outputs and is adapted to selectively produce a fluid connection between a first valve block input and a first valve block output or
(Continued)

between a first valve block input and a second valve block output. The invention is characterized in that the first valve block output furthermore already has a fixed fluid connection to a second valve block input.

20 Claims, 7 Drawing Sheets

(51) Int. Cl.
*E02F 9/22* (2006.01)
*F15B 13/06* (2006.01)

(52) U.S. Cl.
CPC .......... *E02F 9/2267* (2013.01); *E02F 9/2292* (2013.01); *F15B 13/06* (2013.01); *F15B 2211/20576* (2013.01)

(58) Field of Classification Search
CPC .......... F15B 2211/71; F15B 2211/7142; F15B 2211/781
See application file for complete search history.

(56) References Cited

U.S. PATENT DOCUMENTS

| | | | | | |
|---|---|---|---|---|---|
| 4,449,365 | A * | 5/1984 | Hancock | B66F 9/22 60/423 |
| 4,561,249 | A * | 12/1985 | Watanabe | E02F 9/2292 60/429 |
| 7,464,545 | B2 * | 12/2008 | Vigholm | F15B 11/17 60/428 |
| 8,983,741 | B2 * | 3/2015 | Park | E02F 9/2235 701/50 |
| 9,845,813 | B2 * | 12/2017 | Shimizu | F15B 11/044 |
| 9,885,374 | B2 | 2/2018 | Christensen | |
| 9,903,094 | B2 * | 2/2018 | Takahashi | E02F 9/2207 |
| 10,082,159 | B2 * | 9/2018 | Vigholm | F15B 11/161 |
| 10,161,423 | B2 * | 12/2018 | Rampen | F15B 11/162 |
| 11,162,514 | B2 * | 11/2021 | Rampen | F15B 11/0445 |
| 11,614,102 | B2 * | 3/2023 | Mueter | B60T 13/58 417/313 |
| 2007/0234718 | A1 * | 10/2007 | Vigholm | E02F 9/2296 60/468 |
| 2010/0037604 | A1 * | 2/2010 | Rampen | F15B 11/0445 60/445 |
| 2013/0139498 | A1 * | 6/2013 | Bertleff | F15B 11/17 60/484 |
| 2013/0318952 | A1 * | 12/2013 | Park | E02F 9/2235 60/327 |
| 2015/0135697 | A1 * | 5/2015 | Shimizu | E02F 9/2296 60/426 |
| 2020/0182268 | A1 * | 6/2020 | Mueter | B60T 13/58 |

FOREIGN PATENT DOCUMENTS

| | | | | | |
|---|---|---|---|---|---|
| DE | 102008008102 | A1 * | 8/2009 | F15B 11/163 |
| DE | 102012101847 | A1 | 9/2013 | |
| DE | 112013003540 | B4 | 4/2015 | |
| DE | 102017005479 | A1 * | 12/2018 | B60T 13/168 |
| EP | 2664803 | A2 | 11/2013 | |
| JP | S51-26295 | U | 2/1976 | |
| JP | 11181842 | A * | 7/1999 | |
| JP | H11-181842 | A | 7/1999 | |
| JP | 2004-150115 | A | 5/2004 | |
| JP | 2010-76937 | A | 4/2010 | |
| JP | 2010076937 | A * | 4/2010 | |
| WO | 2006/011836 | A1 | 2/2006 | |
| WO | 2008/009950 | A1 | 1/2008 | |
| WO | 2014/097423 | A1 | 6/2014 | |

* cited by examiner

SWITCH VALVE BLOCK FOR A HYDRAULICALLY ACTUATABLE WORKING MACHINE

BACKGROUND OF THE INVENTION

The present invention relates to a switching valve block for a hydraulically actuable work machine, to a hydraulic system, and to a work machine having such a switching block or having such a hydraulic system.

Work machines typically have a plurality of hydraulic consumers, for example a hydraulic steering or a hydraulic lifting cylinder or tilt cylinder for lifting or tilting a load.

If these different hydraulic consumers are actuated by a common hydraulic fluid pump, the highest pressure demanded by both hydraulic consumers must be continuously provided by the pump. This has the result that fluid is supplied to a consumer at a very high pressure under certain circumstances even though this consumer does not actually require such a high pressure and this only takes place because the other consumer currently requires a very high fluid pressure for the performance of its movement. This results in considerable losses that reduce the efficiency of such a work machine.

Due to the above-discussed subject matter, it is known from the prior art to bundle a plurality of pressure sources of small dimensions via a switch valve block in dependence on the requirement of a hydraulic consumer so that hydraulic consumers having a small power requirement receive a smaller power and hydraulic consumers having a greater power requirement receive a greater power.

WO 2008/009950 A1 shows the implementation of such a concept.

It is disadvantageous here that the response time on the start-up of a hydraulic consumer increases considerably, which negatively influences the handling and the operability of such a work machine. It is finally necessary that now the individual smaller pressure sources are combined to one another via valves to actuate the hydraulic consumer.

In the ongoing operation of the machine, a vehicle control device senses and determines the oil requirement of every hydraulic work function in dependence on the driver specification (e.g. a control joystick). The vehicle control decides on the switching of inputs and outputs in the switching valve block or on the actuation/adjustment of the valves contained ("switch position") in dependence on this requirement. The required oil amount is set as a result depending on the work function.

This continuously changing distribution/association of the oil delivery rate to the different hydraulic consumers (such as work functions or steering functions) during machine operation is extremely challenging. It requires very complex algorithms and fast and precisely switching valve technology to ensure operator comfort, which causes a relatively cost-intensive implementation since such valve technology is not available in economic batch sizes on the market.

SUMMARY OF THE INVENTION

It is the aim of the present invention to overcome or at least to alleviate the above-described problem. This is done by a switching valve block that has all the features herein.

In accordance with the invention, a switching valve block for a hydraulically actuable work machine is provided that comprises a plurality of valve block outputs for a respective connection to a pressure output of one or more hydraulic fluid pumps, a plurality of valve block outputs for outputting a pressurized hydraulic fluid, and at least one valve that is arranged between valve block inputs and valve block outputs and that is adapted to selectively produce a fluid connection between a first valve block input and a first valve block output or between a first valve block input and a second valve block output. The invention is characterized in that the first valve block output furthermore already has a fixed fluid connection to a second valve block input.

These pressure outputs of the one or more hydraulic fluid pumps can provide a fluid amount in different manners in dependence on requirements, for example by load sensing (LS) regulation mode in dependence on a consumer specification or also by a direct fluid delivery rate specification by a higher ranking vehicle control device. The selected regulation mode can be dependent on the machine function to be operated (e.g. work function→direct delivery rate specification, steering function→LS regulation mode) and can change in ongoing machine operation.

Provision can likewise be made in accordance with the invention that at least one further hydraulic consumer, that has lower priority as a rule, is supplied via a switching block input that is primarily provided for the lifting or tilting functionality. It is thereby possible to reduce the outputs from the switching block, with the demand of the at least one further hydraulic consumer in turn also having to be taken into account in the load sensing regulation.

The advantage of the present switching valve block is that now a valve position no longer only has to be adopted when the first valve block output is to be supplied with pressurized fluid. Finally, the first valve block output is already fixedly linked to a valve block input so that the pressure level introduced there is available at the output without diversions.

If now, for example, a steering function is linked to the valve block, a valve does not first have to be switched on a steering pulse so that pressure is applied to the steering cylinder, but work can already be carried out with the constantly applied pressure potential. It may admittedly be necessary that the permanently applied pressure is not sufficient for the complete performance of the steering pulse, but that it is sufficient for at least a starting pulse that bridges the time of the valve changeover so that a very much more pleasant operating feeling is produced and the handling of the work machine is improved overall. The same naturally also applies to the other hydraulic consumers not explicitly addressed (for example lifting and tilting or the like). A good response behavior of the work machine is ensured by the provided minimum fluid delivery rate per hydraulic consumer (for example steering, tilting, lifting).

Accordingly, in accordance with the invention, a fixed association of pump pressure outputs to work functions or valve block outputs is contemplated without the possibility of the switch setting. On a movement request of a working or steering function without any time delay, an oil delivery rate of the pump can thus be immediately provided and the cylinder movement performed. The time thereby gained that results due to the omission of the preceding switching on of a pump pressure output can be used for the switching of further valves (if an even greater fluid delivery rate is requested)

Lower demands with respect to switching times thus result for the valves used in the changing valve block, which has a positive effect on the availability of the valve technology and on the total system (with an unchanging high operator comfort).

Provision can be made in accordance with a further development the invention that the at least one valve is a switching valve that exclusively connects one valve block input to one of the plurality of valve block outputs.

A further valve block input (having the pressurized fluid fed in there) is accordingly also switched to a valve block output so that a pressure is adopted there that corresponds to the sum of the two at the valve block inputs. It is accordingly possible due to the valve to provide the additional pressure or the additional fluid amount at that valve block output that just needs or demands it.

Provision can be made in accordance with a further optional modification of the invention that the second valve block output furthermore already has a fixed fluid connection to a third valve block input. It is thus ensured that the hydraulic consumer linked to the second valve block outputs also has a pleasant response behavior.

Provision can also be made that every valve block output already has a fixed, in particular exclusive, fluid connection to a respective valve block input and that furthermore at least one additional fluid connection can be connected to a valve block input via the at least one valve, in dependence on its switching position.

It is thereby achieved that the valve block output can be supplied in dependence on its requirements and on a corresponding valve position with a fluid at a high pressure or with a sufficiently high fluid amount such as would not be possible with a static switch connection to only one valve block input.

The invention further relates to a hydraulic system having a switching valve bock in accordance with one of the above-discussed variants that furthermore comprises a plurality of pressure sources, preferably a plurality of separately controllable pressure sources, of which each one is connected to a respective valve block input and comprises a plurality of hydraulic consumers of which each one is connected to a respective valve block input.

In this context, separately controllable pressure outputs of one or more pumps can be considered as the pressure source. It is, however, equally possible that the plurality of pressure sources are also implemented by separate pumps typically of small dimensions.

Provision can furthermore be made in accordance with the invention that the plurality of pressure sources are a plurality of hydraulic fluid pumps that are independent of one another and/or a plurality of pressure outputs of one or more hydraulic fluid pumps, with preferably the plurality of pressure sources being controllable separately from one another.

It is thus possible to adapt the required fluid amount or the required fluid pressure to the hydraulic activity to be performed.

Provision can furthermore be made in accordance with the invention that the hydraulic consumers comprise a steering cylinder for controlling a work machine, a tilt cylinder for tilting a work machine part, and/or a lifting cylinder for lifting a work machine part.

Provision can furthermore be made that each or at least a plurality of hydraulic consumers are linked to their own valve block output that is exclusively only assigned to this one hydraulic consumer.

Provision is made in accordance with an optional further development of the invention that a control unit is provided for switching the at least one valve and/or the hydraulic fluid delivery rate of the plurality of pressure outputs.

Provision can be made here that the control unit is adapted to set the switching position of the at least one valve and/or the hydraulic fluid delivery rate of the plurality of pressure outputs in dependence on an operator input for actuating one or more hydraulic consumers.

The invention further relates to a work machine, in particular to a wheeled loader, having a switching valve block or a hydraulic system in accordance with one of the variants discussed above.

Provision can be made here that the work machine is adapted to actuate each of the at least two hydraulic consumers, in particular tilting and lifting, and the steering by hydraulic fluid that flows through a respective valve block output associated with the hydraulic consumer.

Provision can be made in accordance with a further optional modification that the pressure present at the valve block output corresponds to the highest fluid pressure at the plurality of valve block inputs and to the sum of the fluid amounts of the valve block inputs that have a fluid connection to the valve block output.

The work machine in accordance with the invention can here furthermore comprise an engine for driving the one or the plurality of hydraulic fluid pumps, with a transfer case preferably being provided between the engine and the one or the plurality of hydraulic fluid pumps.

Provision can be made in accordance with an advantageous embodiment of the invention that two pumps are provided in a tandem arrangement that each have four pressure outputs, preferably four pressure outputs controllable separately from one another.

In the present concept, two pumps can accordingly be operated in a tandem arrangement via a gear stage by an engine (e.g. a diesel engine) and have a plurality of pressure outputs (up to 4 per pump) that are each controlled/commanded separately (one respective control device per pump). In general, a plurality of small pumps can satisfy the same function instead of this special pump.

Provision can additionally be made that the pump senses a sensor for the pressure sensing in every pressure oil output to avoid/curtail impermissibly high pressure increases.

Provision can furthermore be made that the work machine has a control valve block having a plurality of pressure inputs and a plurality of pressure outputs for the control of the work functions in form of the hydraulic consumers. This control valve block is preferably electrohydraulically controlled, as a rule by the vehicle control device or in dependence on the driver specification.

The control valve block is comparable, except for the two separate pressure inputs and (possible) simplifications in the valve design, with conventionally available valve blocks used in wheeled loaders.

Provision can therefore be made that the switching valve block only has a limited number of valve block outputs that are connectable via a control valve block connected downstream to the valve block outputs to a plurality, for example three or more, hydraulic consumers. It is clear in this respect that the simultaneous movement of all the hydraulic consumers is then not possible under certain circumstances since only that number of hydraulic consumers can be moved that are connected to the valve block outputs.

Provision can be made there that the steering function is permanently connected to a valve block output and cannot be connected or disconnected via the control valve block.

Provision can additionally be made that fewer prioritized hydraulic consumers are tapped in parallel by the tilt or lifting cylinder supply output line for cost reasons so that all the hydraulic consumers do not receive their own supply line.

BRIEF DESCRIPTION OF THE DRAWINGS

Further features, details and advantages of the invention will become clear with reference to the following description of the Figures. There are shown.

DESCRIPTION OF THE PREFERRED EMBODIMENTS

Figure 1:
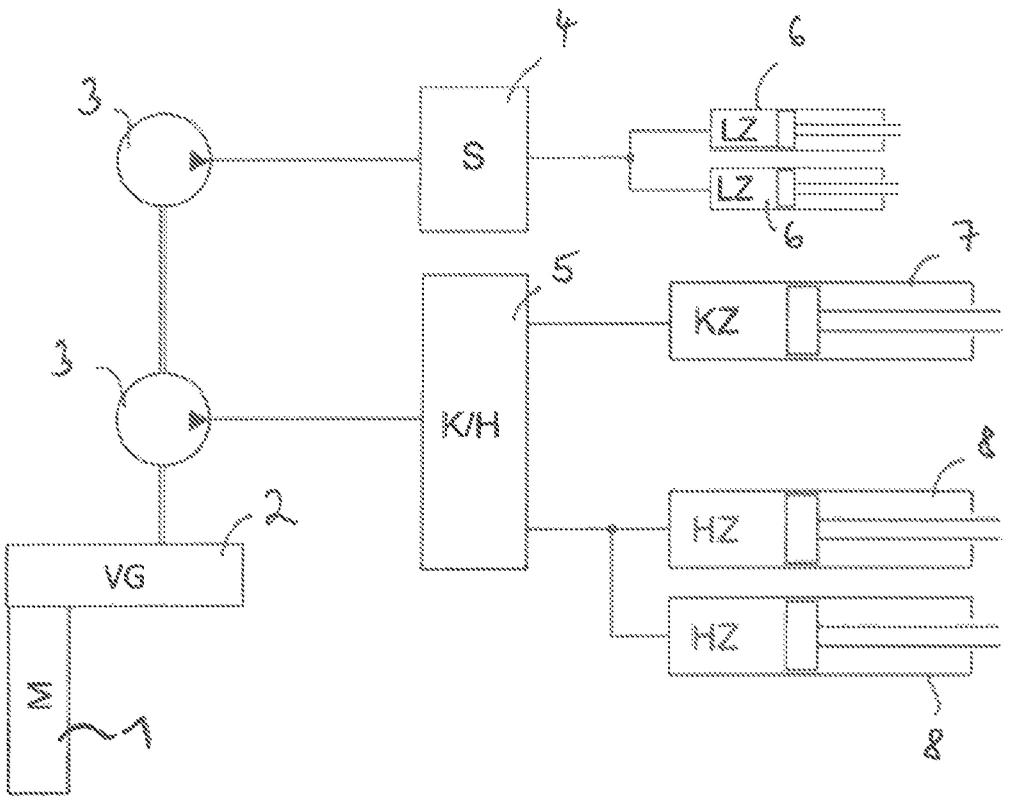
FIG. 1: a schematic representation of a hydraulic system in accordance with the prior art.

FIG. 1 shows a schematic representation of a hydraulic system in accordance with the prior art. An engine 1 can be recognized that drives two pumps 3 via a transfer case 2. One of the two pumps 3 is here connected to a steering control 4 that distributes the fluid pressure provided by the pump 3 and the provided fluid amount for actuating the steering cylinder 6.

The other one of the two pumps 3 is in contact with a tilting and lifting control 5 that controls the actuation of a tilt cylinder 7 and of two lifting cylinders 8. It was already initially mentioned that it is disadvantageous if a pump (the lower of the two pumps 3 in FIG. 1) has to provide the fluid capacity for a plurality of consumers, here the tilting and the lifting, since this represent an inefficient operation.

Although a valve block input and a valve block output are consistently spoken of, it is clear to the skilled person that a direct connection, for example from the pressure source P1, while bypassing a physically formed switching valve block, to a hydraulic consumer is likewise covered by the protective scope of the present invention. The switching block and also the valve block input and output are structures that are to be defined in the abstract so that a direct connection of a pressure source to a hydraulic consumer, in particular to a steering control, also falls within the protective scope of the present application. The direct switching through via a (physical) switching valve block does not necessarily have to take place. It is important for the invention that the hydraulic consumer is linked to a direct connection of a pressure source so that fluid flowing out thereof is directly available.

Figure 2:
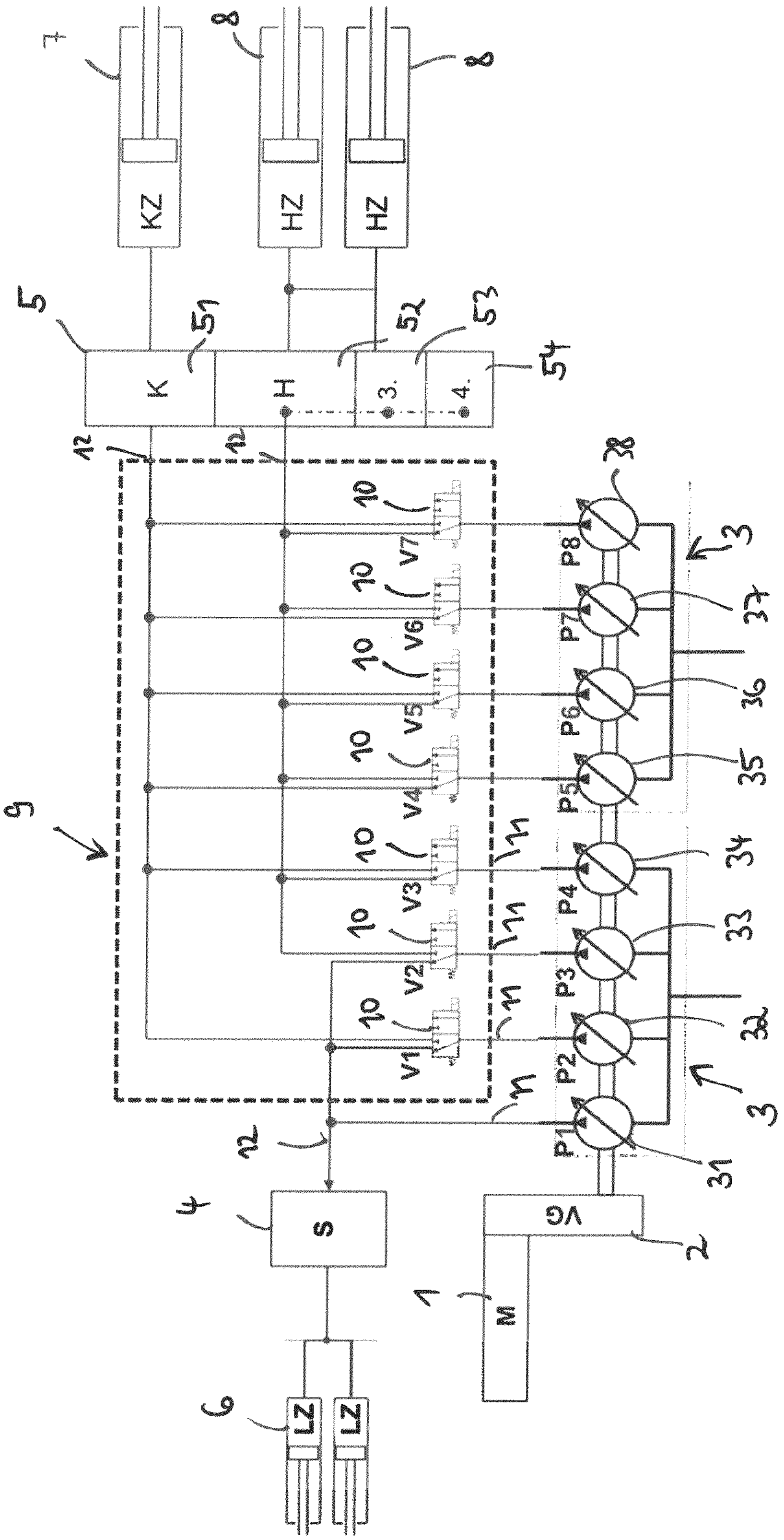
FIG. 2: a schematic representation of a hydraulic system in accordance with the invention.

FIG. 2 shows an embodiment of the present invention. An engine 1 is likewise provided there having a corresponding transfer case 2 and a shaft projecting therefrom at which a plurality of pressure sources 31-38 are arranged that are controllable independently of one another. In the present case, these eight pressure source 31-38 operable independently of one another are implemented by two pumps 3, 3 arranged in tandem operation, of which each one has a plurality (four in the present case) of separately controllable pressure fluid outputs. Each of the total of eight pressure fluid outputs is here connected to its own, associated valve block input 11 that is either directly linked to a valve block output 12 or is guided to a valve (=also switching valve).

In the present FIG. 2, all the pressure fluid outputs 32-38 of the pumps 3, 3 except for one are connected to a switching valve 10. Only the pressure fluid output 31 is directly connected, without a switch, to a valve block output 12 that is guided to the steering control 4. In other words, it is thus ensured that the steering control 4 has the pump capacity of the pressure source 31 permanently and independently of a switching position of the switching valves 10 in the switching valve block 9. If a pump capacity going beyond this is required by the steering control, the switching valves V1 and V2 can be switched such that their associated pressure sources 32, 33 likewise provide their power to the steering control. Three pump sources 31, 32, 33 are thus available in total as required to perform the steering control 4.

The control valve block 5 in which the hydraulic consumers tilting 51 and lifting 52, as well as further consumers 53, 54 not mentioned by name, are arranged are arranged beside the switching valve block 9 on the right side of FIG. 2. With a corresponding valve setting of the switching valves V1 to V7 in the switching valve block 9, the tilt control 51 can be linked to all the pressure sources 31 to 38 so that sufficient power is present for the tilt function for the actuation of the tilt cylinders 7.

The situation is similar with the lifting control 52 that is likewise connectable to the associated pressure sources 33 to 38 with a corresponding position of the valves V2 to V7. The lifting control 52 can here also forward pump capacity to the further consumers 53, 54 that are not shown in detail for reasons of a simplified illustration.

The pump capacity of the plurality of pressure sources can accordingly also be guided to a respective consumer 6, 7, 8 by the invention in dependence on a current demand, with the disadvantages of a poor response behavior typically accompanying this being alleviated in that particularly sensitive consumers, for example the steering, are permanently and exclusively connected to a pressure source (the pressure source 31 here).

Figure 3:
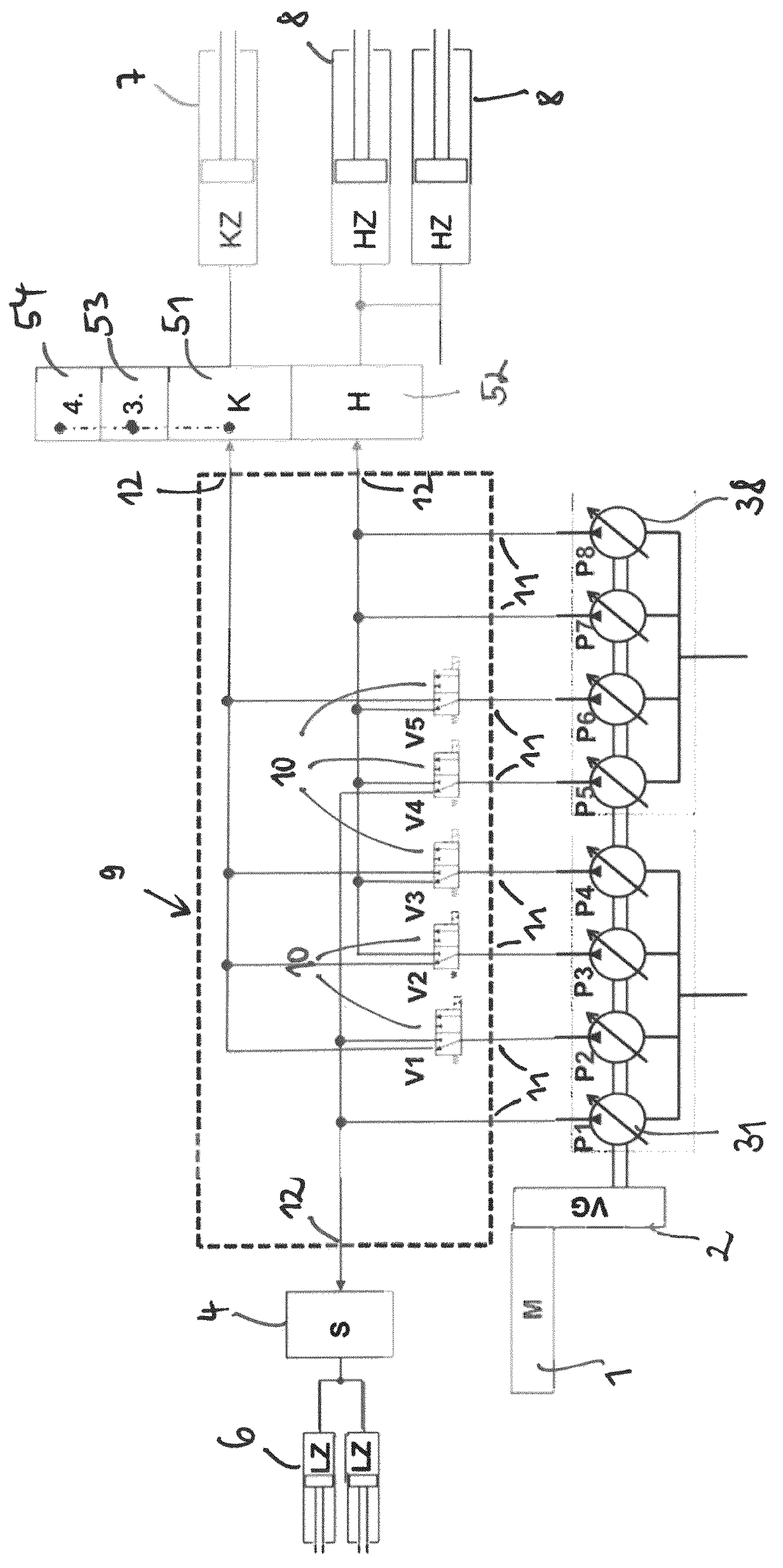
FIG. 3: a schematic representation of a further embodiment of the hydraulic system in accordance with the invention.

FIG. 3 shows a further embodiment of the present invention in which not only the steering control 4 has an exclusive pump capacity, but also the lifting control 52. In this respect, the pumps P7 and P8 are exclusively and unchangeably associated with the hydraulic consumer "lifting" to actuate the lifting cylinders 8. In a similar manner as in FIG. 2, is it also possible to add four further pressure sources P3 to P6 via a corresponding switching of the valves V3 to V5 so that challenging lifting work can also be accomplished.

The tilt control 51 can be connected to a total of four pressure sources P2 to P4 and P6 with a corresponding valve position of the valves V1-V3 and V5. It is likewise possible that the further consumers 53 and 54 are supplied via the tilting control 51 (and not, as shown in FIG. 2, via the lifting control 52).

Figure 4:
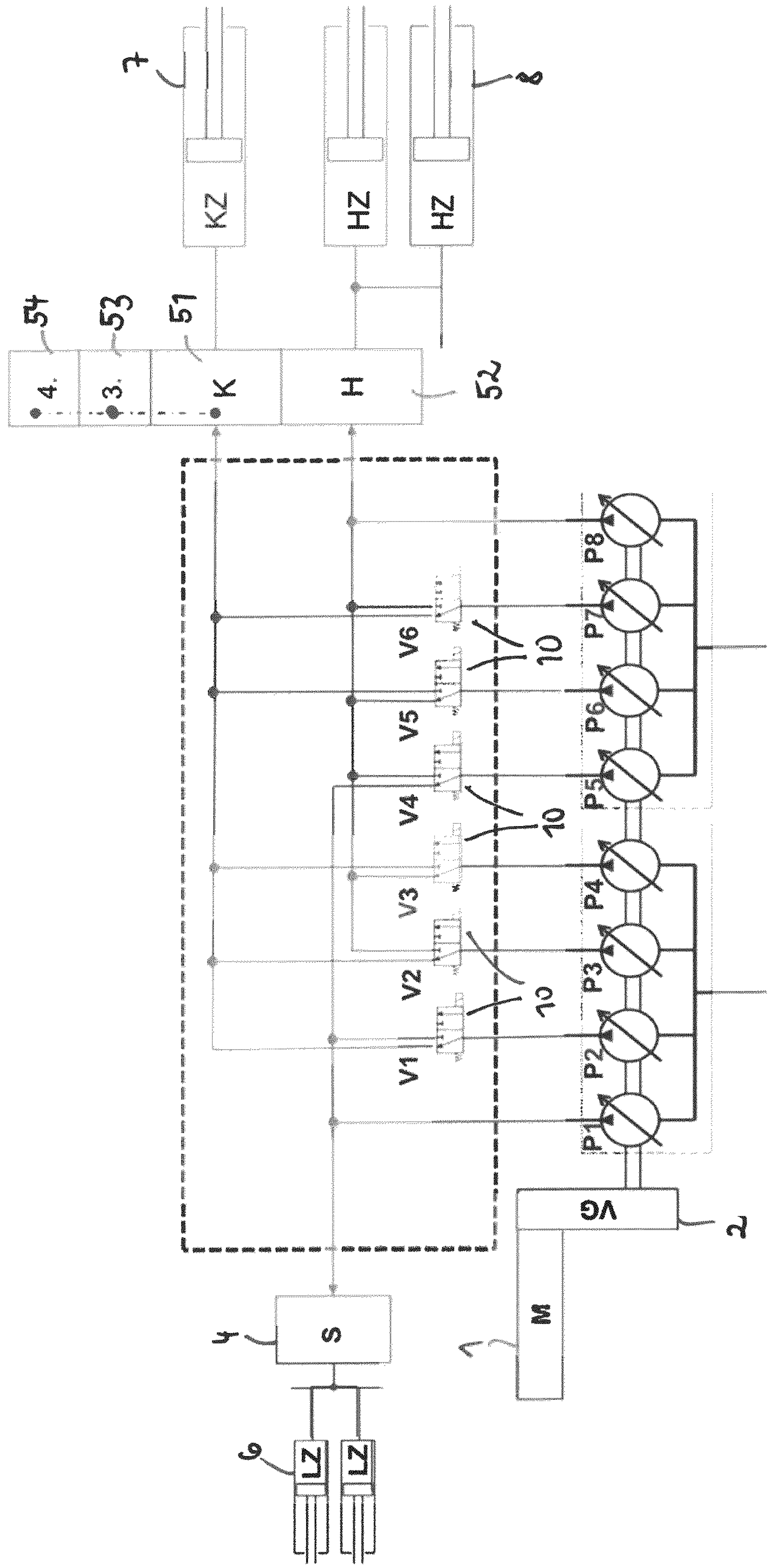
FIG. 4: a schematic representation of a further embodiment of the hydraulic system in accordance with the invention.

FIG. 4 shows a modification of FIG. 3 in which the pressure source P7 is no longer fixedly connected to the lifting control, but rather supplies the pressure power of the pressure source P7 to the lifting control 52 or to the tilting control 52 depending on the position of the valve V6.

Figure 5:
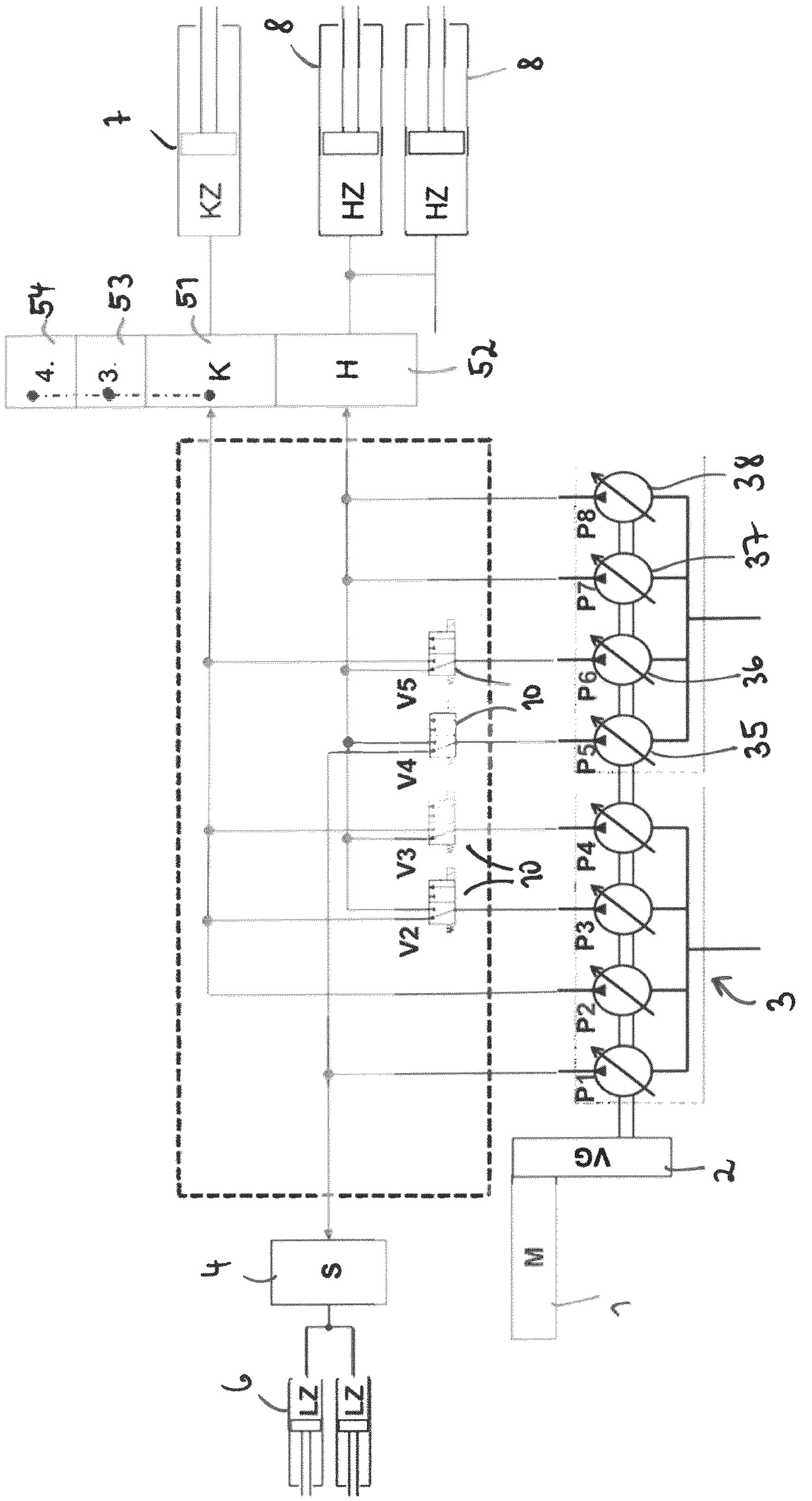
FIG. 5: a schematic representation of a further embodiment of the hydraulic system in accordance with the invention.

FIG. 5 shows a further modification of the invention, wherein now each of the three hydraulic consumes of steering control, tilting, and lifting is fixedly connected to their own pressure sources. The steering control is thus connected to the pressure source P1, the tilting control is connected to the pressure source P2, and the lifting control is connected to the pressure sources P7 and P8. Three of the plurality of valve block outputs are thus now directly and fixedly linked or connected to a valve block input so that no switch or the like is arranged in a fluid connection between the valve block input and the valve block output.

Figure 6:
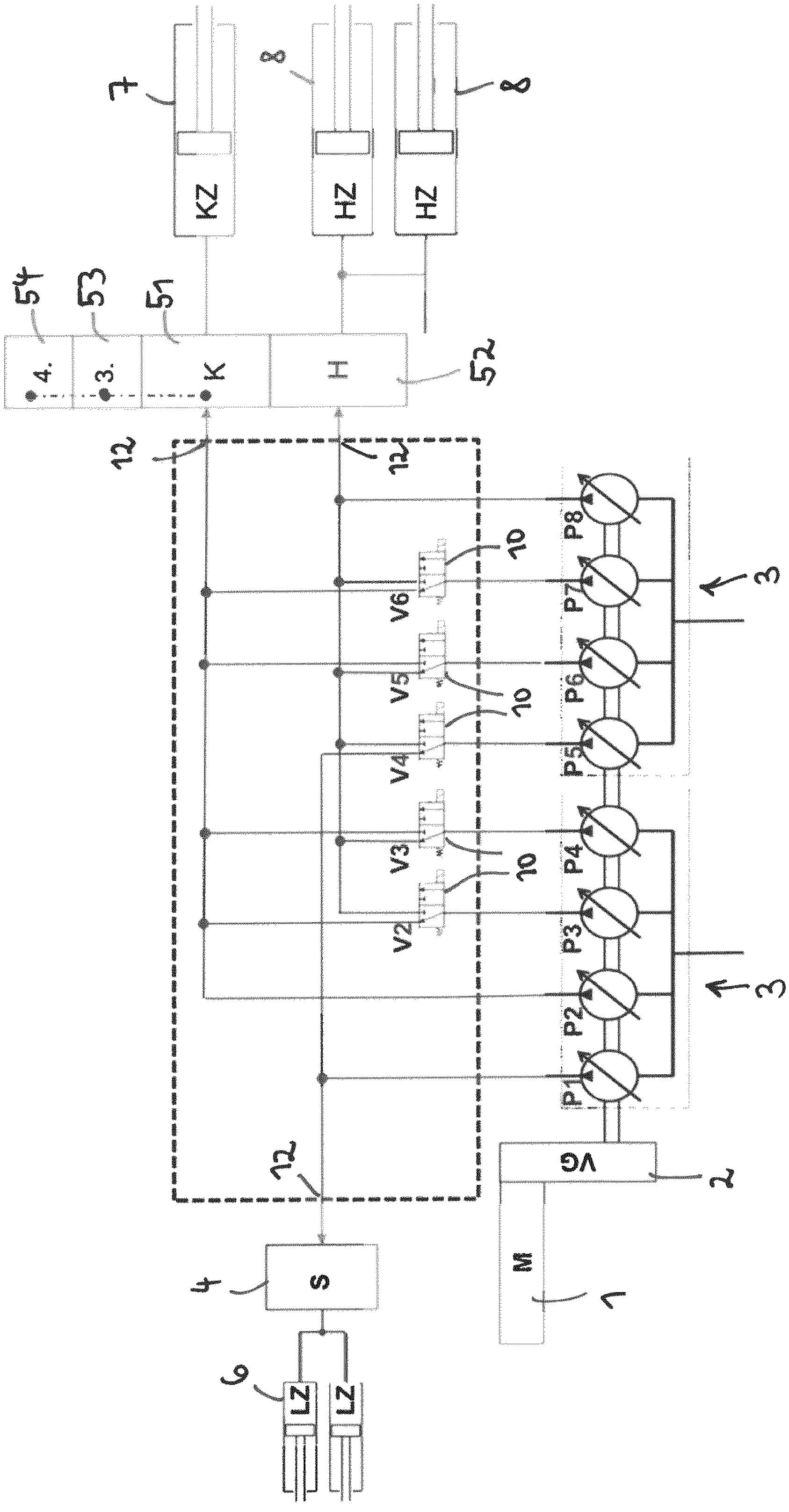
FIG. 6: a schematic representation of a further embodiment of the hydraulic system in accordance with the invention.

FIG. 6 shows a further embodiment of the invention in which the pressure source P1 is associated with the steering control 4, the pressure source P2 is associated with the tilting control, and the pressure source P8 is associated with the lifting control The other still remaining pressure sources P3 to P7 can here be respectively assigned to one of two hydraulic consumers with the aid of a switching valve V2 to V6. In the present case, the valves, V2, V3, V5, and V6 are connected such that the associated pressure sources P3, P4, P6, and P7 can selectively support the function of tilting or the function of lifting. The pressure source P5 can allow selectively allow the power to be assigned to the lifting function or to the steering function via the valve V4.

Figure 7:
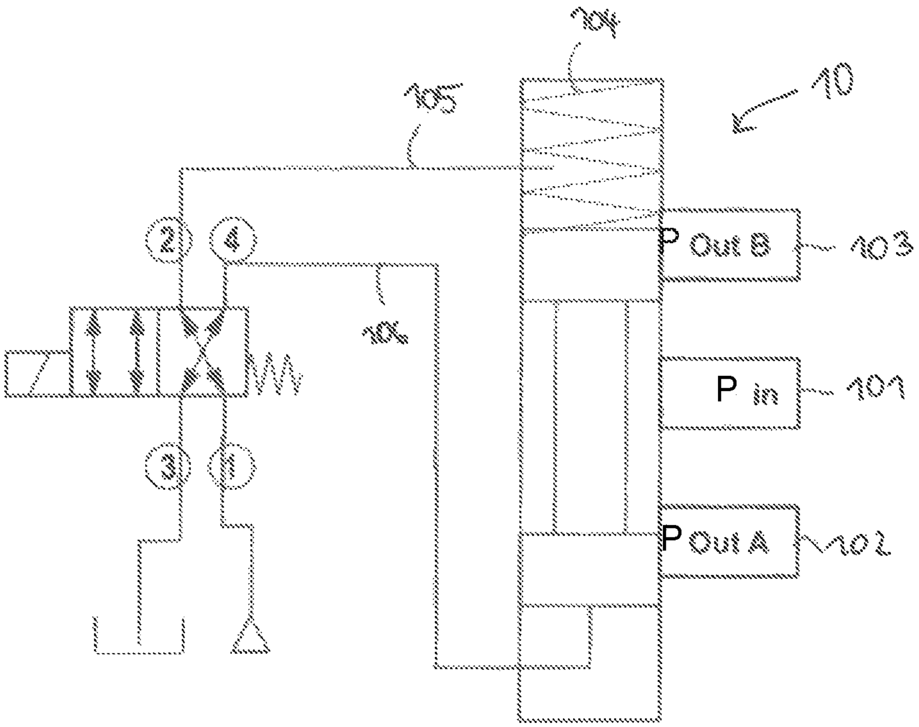
FIG. 7 a schematic representation of a valve of the switching valve block.

FIG. 7 shows a schematic representation of a valve 10 of the switching valve block.

The input 101 that is connected to the valve block input 11 or to the pressure source is fluidically connected to the output 102 or 103. A movable valve element is provided around the connection to one of the two outputs 102 and 103 that has two piston elements that are spaced apart from one another and that are connected to one another via the rod. These piston elements are sealingly arranged in a housing and have such a distance from one another that the input 101 arranged between the two outputs 102 and 103 is fluidically connected to only one of the two outputs 102 or 103 on a corresponding position of the valve element. To move the valve element, a control pressure can be introduced into the housing from above or from below so that the valve element moves in the desired direction. A spring 104 can here be provided for a preload. A switchover via a control valve can be provided for an opposite movement of the valve element, with said control valve selectively connecting the control lines 105, 106 to high pressure or to the low pressure side.

It is of particular advantage if the valve 10 does not have a position in which the input 101 is not connected to an output 102, 103 on a switchover of the fluid connection from one of the two outputs 102, 103 to the other output. It is thus prevented that pressure peaks arise that may occur on a brief closing of the input 101. Provision can be made on a change of the switching position of the valve 10 in the present case that a negative overlap arises, that is the input 101 is connected to both outputs 102, 103 for a brief movement and delivers pressurized fluid to both outputs 102, 103. This temporary state ensures that no blocking of the valve occurs due to a valve position change.

It is not necessarily the case here that pressurized fluid is delivered to both outputs 102, 103; the conveying amount could also be reduced/stopped during the switchover procedure so that no fluid is delivered.

The invention claimed is:

1. A switching valve block for a hydraulically actuatable work machine comprising:

a plurality of valve block inputs for a respective connection to a pressure output of one or more hydraulic fluid pumps;

a plurality of valve block outputs for outputting a pressurized hydraulic fluid; and at least one valve arranged between valve block inputs and valve block outputs and adapted to selectively produce a fluid connection between a first valve block input and a first valve block output or between a first valve block input and a second valve block output, wherein a first valve block output has a fixed fluid connection to a second valve block input, and a second valve block output has a fixed fluid connection to a third valve block input.

2. A switching valve block in accordance with claim 1, wherein the at least one valve is a switching valve that exclusively connects one valve block input to either the first valve block output or the second valve block output.

3. A switching valve block in accordance with claim 1, wherein the at least one valve is adapted to be connected at any time during a switching procedure to one or both of the valve block outputs to be switched over to avoid pressure peaks during the switching over of the hydraulic fluid.

4. A switching valve block in accordance with claim 1, wherein every valve block output has a fixed fluid connection to a respective valve block input, and at least one additional fluid connection is connectable to a valve block input via the at least one valve, in dependence on its switching position.

5. A switching valve block in accordance with claim 4, wherein every valve block output has a fixed fluid connection exclusively connected to a respective valve block input.

6. A hydraulic system having a valve switching block in accordance with claim 1, further comprising:

a plurality of pressure sources of which each one is connected to a respective valve block input; and a plurality of hydraulic consumers of which each one is connected to a respective valve block output.

7. A hydraulic system in accordance with claim 6, wherein the plurality of pressure sources are a plurality of hydraulic fluid pumps that are independent of one another and/or a plurality of pressure outputs of one or more hydraulic fluid pumps.

8. A hydraulic system in accordance with claim 6, further comprising a control unit for switching the at least one valve and/or the hydraulic fluid delivery rate of the plurality of pressure outputs.

9. A hydraulic system in accordance with claim 8, wherein the control unit is adapted to set the switching position of the at least one valve and/or the hydraulic fluid delivery rate of the plurality of pressure outputs in dependence on an operator input for actuating one of the plurality of hydraulic consumers.

10. A hydraulic system in accordance with claim 6, wherein said plurality of pressure sources are separately controllable.

11. A work machine having a switching valve block in accordance with claim 1.

12. A work machine in accordance with claim 11, adapted to actuate each of the at least two hydraulic consumers, and the steering by hydraulic fluid that flows through a respective valve block output.

13. A work machine in accordance with claim 11, wherein the fluid current present at the valve block output corresponds to the sum of the individual volume flows of the plurality of valve block inputs that have a fluid connection to the valve block output.

14. A work machine in accordance with claim 11, further comprising an engine for driving the one or the plurality of hydraulic fluid pumps.

15. A work machine in accordance with claim 14, wherein a transfer case is provided between the engine and the one or the plurality of hydraulic fluid pumps.

16. A work machine in accordance with claim 11, further having two pumps in a tandem arrangement that respectively has four pressure outputs.

17. A work machine in accordance with claim 16, wherein the four pressure outputs are separately controllable from one another.

18. A switching valve block in accordance with claim 1, wherein the fixed fluid connection is exclusively connected to the second valve block input.

19. A hydraulic system having a switching valve block for a hydraulically actuatable work machine comprising:

a plurality of valve block inputs for a respective connection to a pressure output of one or more hydraulic fluid pumps;

a plurality of valve block outputs for outputting a pressurized hydraulic fluid;

at least one valve arranged between valve block inputs and valve block outputs and adapted to selectively produce a fluid connection between a first valve block input and a first valve block output or between a first valve block input and a second valve block output;

a plurality of pressure sources of which each one is connected to a respective valve block input; and a plurality of hydraulic consumers of which each one is connected to a respective valve block output, wherein a first valve block output has a fixed fluid connection to a second valve block input, and hydraulic consumers comprise a steering cylinder for steering a work machine, a tilt cylinder for tilting a work machine part, and/or a lifting cylinder for lifting a work machine part.

20. A hydraulic system in accordance with claim 19, comprising at least one further control circuit for a hydraulic consumer that fluidically starts at a control circuit for the steering cylinder or for the tilt cylinder.

* * * * *